United States Patent [19]

Schumacher et al.

[11] Patent Number: 5,113,655
[45] Date of Patent: May 19, 1992

[54] APPARATUS AND METHOD FOR REMOVING LIQUID CONDENSATE FROM A COMPRESSED-AIR SYSTEM

[75] Inventors: Josef Schumacher, Reutlingen; Claus Töpfer, Sindelfingen, both of Fed. Rep. of Germany

[73] Assignee: Daimler-Benz AG, Fed. Rep. of Germany

[21] Appl. No.: 532,570

[22] Filed: Jun. 4, 1990

[30] Foreign Application Priority Data

Jun. 2, 1989 [DE] Fed. Rep. of Germany ....... 3917964

[51] Int. Cl.$^5$ ............................................. F16D 31/02
[52] U.S. Cl. ...................................... 60/408; 60/409; 60/412; 60/453; 91/32
[58] Field of Search ................. 60/370, 378, 407, 409, 60/412, 453, 408; 91/6, 32

[56] References Cited

U.S. PATENT DOCUMENTS

| | | | |
|---|---|---|---|
| 1,662,922 | 3/1928 | Helmer | 92/240 |
| 2,311,806 | 2/1943 | Almond | 91/32 |
| 2,985,358 | 5/1961 | Lee et al. | 92/240 |
| 4,273,027 | 6/1981 | Reinhard et al. | 91/6 |
| 4,730,550 | 3/1988 | Bramstedt et al. | 92/240 |
| 4,811,562 | 3/1989 | Hoffman et al. | 60/370 |
| 4,939,899 | 7/1990 | Holzhauer et al. | 60/412 |

FOREIGN PATENT DOCUMENTS

| | | |
|---|---|---|
| 3203152 | 8/1983 | Fed. Rep. of Germany . |
| 3638974 | 5/1988 | Fed. Rep. of Germany . |
| 3641267 | 6/1988 | Fed. Rep. of Germany . |
| 3710347 | 10/1988 | Fed. Rep. of Germany . |

*Primary Examiner*—Edward K. Look
*Assistant Examiner*—F. Daniel Lopez
*Attorney, Agent, or Firm*—Evenson, Wands, Edwards, Lenahan & McKeown

[57] ABSTRACT

An apparatus and method are disclosed for the simple removal of liquid condensate, in particular of water of condensation, from compressed-air systems alternately subjected in operation to positive pressure and atmospheric pressure. The compressed-air system is first of all connected for a limited period, at intervals or after each subjection to positive pressure, to a vacuum generator in order to promote re-evaporation of the condensate and is evacuated by the latter before atmospheric pressure is passed in or let in again. In certain embodiments, a highly restricted reverse flow through the compressed-air system is permitted. The method is particularly suitable for use in small-volume compressed-air systems which do not have to be permanently subjected to positive pressure, e.g., in pneumatic door-closing aids for motor cars.

39 Claims, 2 Drawing Sheets

APPARATUS AND METHOD FOR REMOVING LIQUID CONDENSATE FROM A COMPRESSED-AIR SYSTEM

BACKGROUND AND SUMMARY OF THE INVENTION

The invention relates to a method and apparatus for removing liquid condensate from a small volume compressed air system for automotive vehicle door closing systems and the like.

A closing apparatus having a pneumatic auxiliary closing system is known from German Patent Document DE 37 10 347 Al, which assists a vehicle user when closing and opening the doors of his vehicle. A single double-acting actuator having two working chambers is assigned in each case to a reversible pneumatic pump, which for assisting door closure and for assisting door opening is subjected on the one hand to positive pressure and on the other hand to a vacuum, in each case by a correspondingly reversed direction of delivery of the pump, the actuator performing mechanical work in both directions of movement.

Evacuation of the pneumatic system to remove liquid condensate is not disclosed there and is not possible either, because, on the one hand, relatively high positive pressures have to be built up and, on the other hand, the pump running times are in each case limited to the period of time absolutely necessary for performing the mechanical work. Furthermore, the auxiliary closing system can only be switched on the basis of a request for closing or opening assistance.

A compressed-air system with a continuously operating pressure generator is known from German Patent Document DE 32 03 152 A1, which has an air reservoir, an air drier and a regeneration device for the latter. The regeneration device can be connected by a switchable valve to the vacuum side of a venturi nozzle through which the compressed-air stream for idling flows, in order, for the purpose of improving the result of regeneration, to increase the pressure difference between the pressure of the air in the dry phase and the pressure of the regeneration air. The known arrangement contains a relatively large number of valves. For reverse-flow regeneration of the air drier, compressed air from the reservoir must also be available at all times since the relatively low vacuum produced at the venturi nozzle is not sufficient on its own for condensate evaporation.

It is generally known that in pneumatic systems which are alternately subjected to positive air pressure and to atmospheric pressure that water of condensation can precipitate on the inner walls of the system components if, due to the positive air pressure, the water-vapor saturation line of the air at the prevailing temperature is exceeded. This is a result of the physical fact that air can isothermally absorb more water molecules per unit volume at low pressure than at high pressure. A subsequent letting down of the system pressure to atmospheric level does not necessarily bring about the complete re-evaporation of the condensate into the air remaining in the system, resulting in problems, especially at temperatures below the freezing point.

A washing drier is furthermore known from German Patent Document DE 33 21 245 A1, the drying space of which can be evacuated by means of a water jet pump in order to assist the evaporation of the residual moisture. Subjection of the drying space to positive pressure and positive pressure consumers are not envisaged there.

It is an object of the invention, starting from the generic compressed-air system, to specify a method by which water of condensation can be removed in a simple but reliable manner from the system, which is alternately subjectable to pneumatic positive pressure and not subjected to pneumatic positive pressure and, in the state of rest, is under atmospheric pressure, and to at least modify a device of the generic type with a view to carrying out the method according to the invention.

This object is achieved according to preferred embodiments of the invention by providing a system and operating method for removing condensation from a compressed-air system of the type which is subjected to pneumatic positive pressure during a mechanical work performing operation and is vented to ambient atmospheric pressure when not performing mechanical work, said method comprising:

subjecting the compressed-air system to vacuum pressures below atmospheric pressure immediately following work performing operations to thereby cause condensation in the compressed-air system to vaporize.

The water of condensation which has precipitated during the subjection of the system to positive pressure on the inner walls of its components evaporates rapidly again if the system is temporarily subjected to a vacuum immediately after being subjected to a positive pressure. Only after this temporary evacuation is the compressed-air system returned to its state of rest with atmospheric pressure.

This method is particularly suitable for use in small-volume compressed-air systems in which the consumers can be connected directly to a positive pressure/-vacuum generator via lines and do not have to be subjected continuously to positive pressure, e.g. in pneumatic door-closing aids for motor cars.

The subjection of the compressed-air system to a vacuum according to the invention can be performed at relatively large intervals—in the case of low incidence of condensate in a dry environment—or after each subjection to positive pressure in damper environments.

An arrangement for controlling a dual pressure pump of an electropneumatic central locking system of a motor vehicle is also described in German Patent Document DE 36 41 276 A1 which, after each operating cycle, drives the dual pressure pump at rated speed in the opposite direction of rotation to that previously in order to bring the system pressure rapidly back to atmospheric level. In a system of this kind, water of condensation does not occur in damaging amounts due to the low positive pressures. Subjection of the system to a vacuum by the dual pressure pump is only provided for the purpose of initiating an actuating procedure of the lock actuating elements opposite to that in the case of subjecting to positive pressure, with the result that the dual pressure pump must be switched off in good time during the reversed operation following subjection to positive pressure to ensure that no undesired actuating procedure occurs due to subjection to a vacuum.

In contrast to the arrangement described in German Patent Document DE 36 41 276 A1, the vacuum of a dual pressure pump in an embodiment of the device according to the invention is not employed for an actuating operation but simply for drying air or evaporating condensate. Of course such a procedure is only sensible if no undesired actuating operations can occur due to subjection of actuating elements present in the compressed-air system to a vacuum.

In certain preferred embodiments, a dual reversible pump is used for generating both positive and vacuum pressure with resultant advantages due to the economy and simplicity of design. In other preferred embodiments, separate electric pumps are provided for producing the positive and vacuum pressures, with resultant advantages for effecting reverse flow to enhance removal of condensation from the system. The present invention also contemplates a special pressure consumer construction with a lip seal and housing valve controls accommodating the operation thereof in conjunction with the vacuum supply for condensate removal operations.

Other objects, advantages and novel features of the present invention will become apparent from the following detailed description of the invention when considered in conjunction with the accompanying drawings.

DETAILED DESCRIPTION OF THE DRAWINGS

Figure 1:
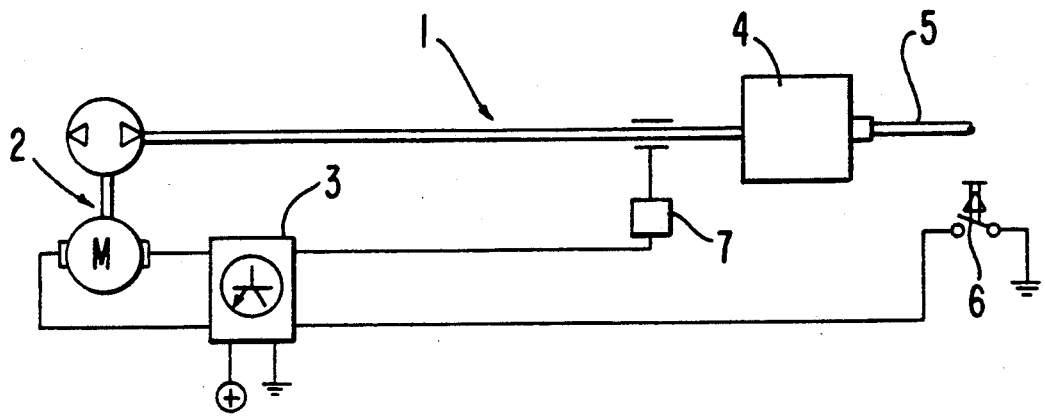
FIG. 1 is a schematic view which shows a compressed-air system with a dual pressure pump, with which adequate condensate removal is possible, constructed according to a preferred embodiment of the invention.

FIG. 1 represents a simple compressed-air system 1 having an electric dual pressure pump 2, a control circuit 3 of the latter and a single consumer 4 which can, for example, be an actuating element with a control member 5 for a pneumatic door-closing aid in a motor vehicle (not shown). The control member 5 is permanently or only temporarily coupled (in a manner not shown) to a closing member of a door or tailgate lock. When the actuating element is subjected to positive pressure by the pressure generator 2, it performs mechanical work by pressing the closing member in the door-closing direction by means of control member 5.

In such an application arrangements are contemplated wherein, in the case of subjection to a vacuum, the control member 5 is decoupled from or only temporarily coupled to the component to be actuated, in the actuating direction. If this were not possible, a similar object could be achieved according to certain preferred embodiments by a mechanical locking of the control member 5 during subjection to a vacuum—which could be directly controllable by the vacuum itself or controllable electrically when vacuum generation is switched on. In the specific case of a door-closing aid, however, the control member can also simply be locked by the component movable by it and firmly coupled to it being mechanically blocked, directly or indirectly, by the door lock until the door is reopened.

Here in the illustrative embodiment of FIG. 1, this means that a movement of the control member 5 to the left resulting from subjection to a vacuum by the dual pressure pump 2 should at least not result in a movement of the component (such as door lock members, not shown) movable by the members. This means that when the actuating element is subjected to a vacuum, no mechanical work is performed by it.

The control circuit 3 of the dual pressure pump 2 receives a starting pulse from an electric momentary-contact switch 6 and activates the dual pressure pump 2 for the purpose of generating positive pressure. After the dual pressure pump 2 has been switched off by a pressure switch 7 in the compressed-air system 1, the control circuit 3 activates the dual pressure pump in a manner known per se, e.g. during a predetermined period of time or until a corresponding switching signal of the pressure switch 7, in a vacuum-generating direction of running Any actuating movement of the control member 5 arising during this is of no importance, as mentioned; however, the evacuation of the compressed-air system 1 gives rise temporarily to a vacuum therein which brings about the re-evaporation of condensed water. Via the dual pressure pump 2, through which flow can occur in the state of rest, atmospheric pressure finally passes back into the evacuated compressed-air system 1 after the pump has finally been switched off.

Figure 2:
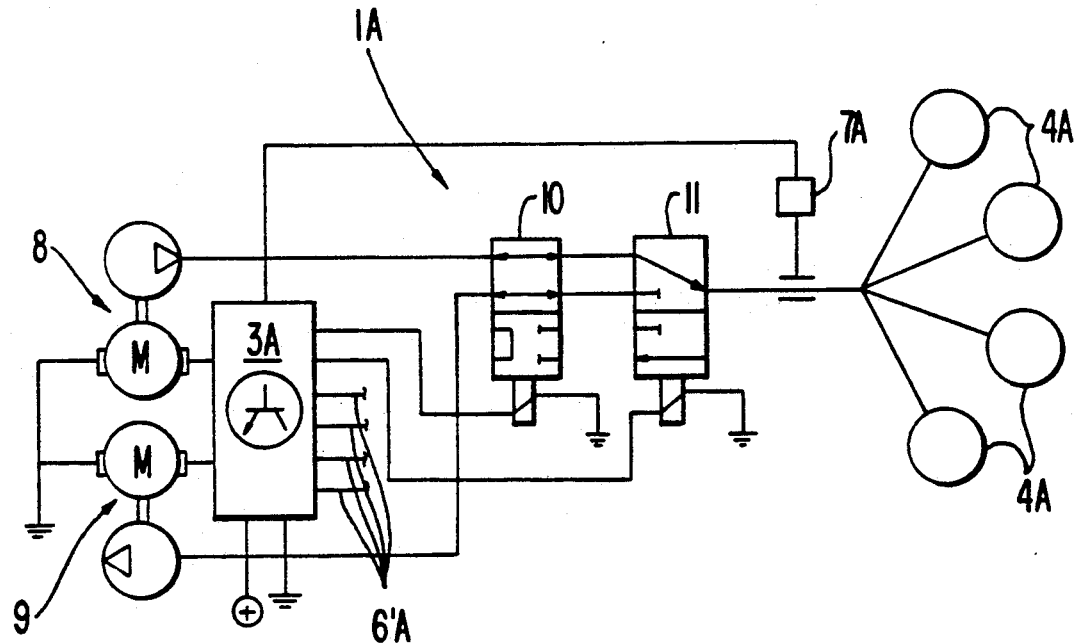
FIG. 2 is a schematic view which shows a variant compressed air system in which condensate removal both from the positive pressure generator and from the consumers is possible by virtue of a separate vacuum generator, constructed according to another preferred embodiment of the invention.
Figure 3:
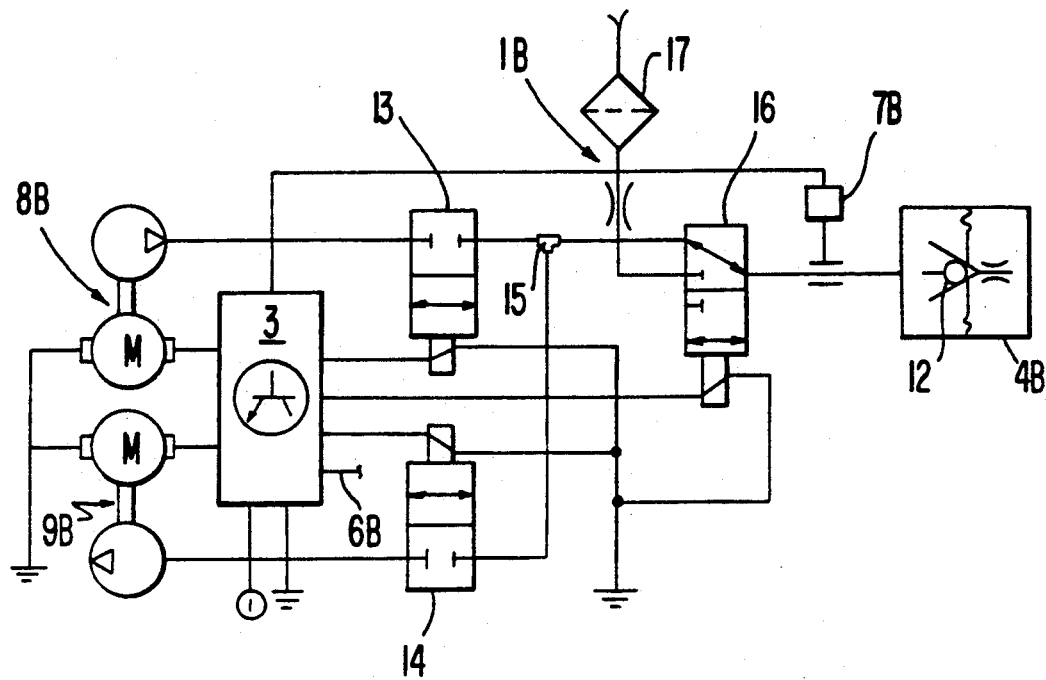
FIG. 3 is a schematic view which shows a compressed-air system which additionally includes a non-return valve arranged away from the vacuum generator for permitting reverse flow through the system and thus carrying away of the sucked-in air with the re-evaporated condensate, constructed according o yet another preferred embodiment of the invention.

In FIGS. 2 and 3, components whose function remains substantially similar also have the same reference numerals as in FIG. 1 with suffices "A" in FIG. 2 and "B" in FIG. 3.

FIG. 2 shows another compressed-air system 1A having a plurality of consumers 4A indicated schematically, in which an electric positive pressure pump 8 and an electric vacuum pump 9 can be activated by the control circuit 3A. The control circuit 3A here has a plurality of pulse inputs 6A, via each of which it can be driven for activating the positive pressure pump 8. An electromagnetically switchable 4/2-way- valve 10 and a 3/2 way valve 11 are also arranged in the compressed-air system 1A between the pumps 8 and 9 and the consumers 4A. Both valves are electrically controllable by the control circuit 3A. The 4/2 way valve 10 can connect the vacuum pump 9 either to the consumers 4A or to the positive pressure pump 8, while the 3/2-way valve 11 connects either the positive pressure pump 8 or the vacuum pump 9 to the consumers 4A. After a sufficient pressure buildup, again signalled by the pressure switch 7A, and switching off of the positive pressure pump 8, the 3/2-way valve 11 is switched over by the control circuit 3A and the vacuum pump 9 is switched on for a limited period. The vacuum thereby generated in the compressed-air system 1A causes the condensate to evaporate. If required, after the return of the 3/2-way valve 11 into the unactuated state of rest the 4/2-way valve 10 can also be switched and a vacuum applied also to the positive pressure pump 8 in order to remove condensate which has occurred from this as well. This operation can be performed after each evacuation of the consumers 4A or cyclically at relatively large intervals. The intervals can be determined by a moisture sensor or the like known per se. Finally, the vacuum pump 9 is switched off again, the 4/2-way valve 10 also returns to its position of rest and atmospheric pressure passes back into the compressed-air system 1A via a flow short-circuit in the positive pressure pump 8. To speed up the evacuation of the system, this flow short-circuit can also be used for venting the compressed-air system i.e., for decompressing the air pressure therein to atmospheric level before, e.g., after the expiry of a waiting period, the apparatus is switched over to the pump effected evacuation. The quantity of air to be transported by the vacuum pump is thereby reduced. The consumers 4A can, for example, also be pneumatically operable tools, during the use of which the positive pressure generator 8 is switched on as required. It is self evident that any positive pressure accumulator present is not likewise evacuated but is separated from the compressed-air system by a non-return valve or the like switchable in the closing direction during the evacuation operation of the compressed-air system 1A.

No flow through the respective compressed-air system 1 or 1A having been possible in the two variants described above even in the case of a vacuum being applied, the installation of a non-return valve as far as possible away from the respective vacuum generator, as FIG. 3 shows, makes possible reverse flow through the compressed-air system and thus also the drawing off of the air which has absorbed the re-evaporated condensate. Integrated into the consumer 4B, of which there is at least one, is here a schematically indicated non-return valve 12 having a restricting effect, which blocks when the consumer 4B is subjected to positive pressure but opens when subjected to a vacuum. It can of course also be attached to the consumer in a suitable manner. The non-return valve 12 can furthermore be designed in a known manner in such a way that it only opens at a certain threshold value of the vacuum applied, e.g., by virtue of resilient prestressing into its closing position.

Similarly to FIG. 2, a positive pressure pump 8B and a vacuum pump 9B are in each case provided in the FIG. 3 embodiment. Both pumps 8B and 9B are here connected to the compressed-air system 1B in each case via an electromagnet—2/2-way valve 13 and 14 respectively, the outputs of which are brought together at a junction 15. Provided between the junction 15 and the consumer 4B is a 3/2-way valve 16 which either connects the consumer 4B to the junction 15—in the case of electrical activation, which is always present in parallel with the operation of one of the two pumps 8B or 9B—or—when unswitched, i.e. in the state of rest of both pumps 8B or 9B—connects the consumer 4B to the atmosphere. The atmosphere connection of the 3/2-way valve 16 has an air filter 17 with a downstream restrictor.

The already mentioned venting or letting down of the compressed-air system to atmospheric pressure before evacuation is of course likewise possible in a simple manner with this arrangement in that a waiting period is maintained between the switching off of the positive pressure pump 8B and the switching on of the vacuum pump 9B, in the course of which, as described, the breather valve connects the compressed-air system to the ambient air.

The electrical control of the variant illustrated in FIG. 3 corresponds essentially to that shown in FIG. 2 and is therefore not described again specially. Here too, condensate removal is again possible both from the positive pressure pump 8B and from the consumer 4B.

Compared to the systems described first, the air-drying effect of the arrangement according to FIG. 3 is markedly greater. An arrangement with non-return valve(s) is therefore preferentially employed when a large amount of condensate is expected to arise. Of course, arrangements according to FIGS. 1 and 2 can also be equipped with nonreturn valves on the consumer side. In the arrangement of the nonreturn valves, an important consideration is that these should be fitted as far as possible away from the vacuum generator so that the reverse flow sweeps through the entire compressed-air system as far as possible.

In the case where the consumers are designed as piston actuators, a nonreturn valve of simple design can be integrated into then, in that the actuating piston contains a lip seal acting in one direction.

Figure 4:
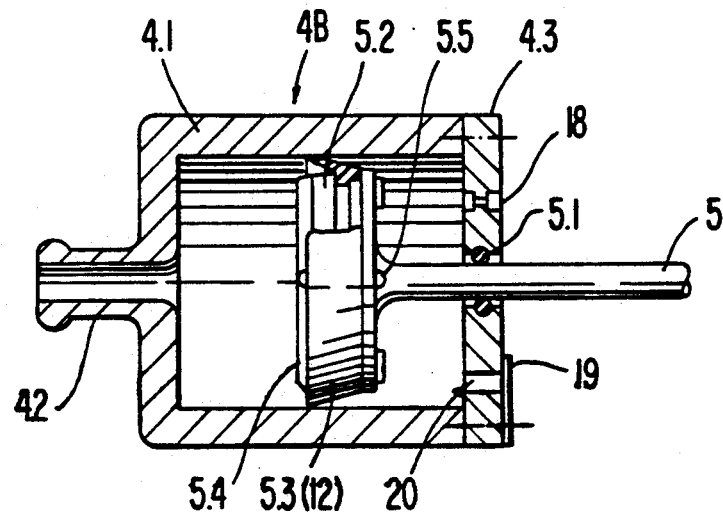
FIG. 4 is a schematic sectional view which shows an actuating element/piston drive with a lip seal acting as an integrated non-return valve for use with preferred embodiments of the present invention.

FIG. 4 shows an example of such an actuating piston with lip seal. A consumer 4B designed as a single-acting actuating element with a control member 5B is represented with a cut-away cylindrical housing 4.1. A connecting branch 4.2 of the housing 4.1 can be connected to a compressed-air system(not shown). The control member 5B is passed out of the housing 4.1 through a housing cover 4.3. The opening in the housing cover is sealed off with respect to the control member by a suitable ring seal 5.1 or by a rolling diaphragm seal. The control member is mechanically firmly connected to an actuating piston 5.2 linearly displaceable in the housing 4.1 The actuating piston 5.2 carries an annular lip seal 5.3. When the connecting branch 4.2 is subjected to positive pressure, the sealing lip of said lip seal comes to rest against the inner wall of the housing 4.1, in the case of subjection to a vacuum it lifts off from the inner wall at least in places. It is here possible, via the deformation resistance of the sealing lip due to corresponding selection of material or shaping, for an opening threshold value of the "nonreturn valve" to be specified. Such lip seals are used in a simple design in bicycle air pumps. Formed in the housing cover 4.3 in addition to the opening for the control member 5 with the ring seal 5.1 is a restriction bore 18 and an outlet bore 20 which can be shut off by a flutter valve 19. At its base facing towards the connecting branch 4.1, the actuating piston 5.2 has distance or spacing ribs 5.4 and distance knobs 5.5 are provided on the other side of the actuating piston. Both contourings 5.4 and 5.5 in a known manner prevent impact of the surface of the actuating piston 5.2 on the inner housing bases.

When the actuating piston 5.1 is moved to the right by subjection to positive pressure, the air behind the actuating piston can escape easily through the outlet bore 20 and through the flutter valve 19. A high actuating speed is thereby achievable. If the actuating piston is subjected to a vacuum and moves away from the housing cover 4.3, the flutter valve 19 closes the outlet bore 20, with the result that air can then only pass through the restriction bore 18 into the space behind the actuating piston. Slow reverse flow through the consumer 4 is then possible via the restriction bore 18 and past the lip seal 5.1 to the connecting branch 4.2. The distance ribs 5.4 still permit this flow even when the actuating piston 5.2 is resting on the housing base at the left-hand side. At the same time, they prevent any contact of the lip seal with the housing base.

The vacuum necessary for the evaporation of condensate arises due to the great restriction of this reverse flow in the restriction bore 18. When an actuating element of this kind is used in a very dusty environment, a cylindrical bore with an inserted sintered restrictor which simultaneously acts as an air filter is preferably provided instead of the simple narrow restriction bore.

The use of the piston actuator described above is of course not restricted exclusively to the device according to the invention. On the contrary, it can be used wherever reverse flow through the system may be desired in a compressed-air system.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Method for removing condensation from a compressed-air system of the type which is operable to effect a mechanical work performing operation only when subjected to pneumatic positive pressure and is vented to ambient atmospheric pressure when not performing mechanical work, said method comprising:
   only temporarily subjecting the compressed-air system to vacuum pressures below ambient atmospheric pressure following work performing operations to thereby cause condensation in the compressed-air system to vaporize,
   wherein said compressed-air system includes a pressure consumer at which the pneumatic positive pressure is applied to a movable member which performs the mechanical work in response to the subjection thereof to the pneumatic positive pressure,
   and wherein said pressure consumer and movable member are operably connected such that no mechanical work is performed during subjection of said vacuum pressure.

2. A method according to claim 1, wherein said temporarily subjecting the compressed-air system to vacuum pressure below ambient pressure is effected immediately following the work performing operations.

3. Method according to claim 1, wherein said movable member is part of a pneumatically operated automotive vehicle door closing system.

4. Method according to claim 1, wherein said subjecting the compressed-air system to vacuum pressure is done immediately after each subjection of the consumer to pneumatic positive pressure before venting of the compressed-air system to ambient atmosphere pressure.

5. Method according to claim 4, wherein said movable member is part of a pneumatically operated automotive vehicle door closing system.

6. Method according to claim 1, further comprising applying restricted reverse flow through the compressed-air system while it is subject to the vacuum pressure, thereby assisting in condensate removal.

7. Method according to claim 6, wherein said movable member is part of a pneumatically operated automotive vehicle door closing system.

8. Method according to claim 1, wherein a reversible dual pressure pump is provided for generation of both said positive pressure and said vacuum pressure, and wherein electric control means are provided for controlling operation of the pump with switching from positive pressure generation to vacuum pressure generation immediately following a positive pressure generation.

9. Method according to claim 8, wherein said movable member is part of a pneumatically operated automotive vehicle door closing system.

10. Method according to claim 1, wherein the compressed-air system pressure is momentarily connected to ambient atmosphere after subjection to positive pressure for a mechanical work performing operation to thus reduce the pressure before said subjection to vacuum pressure.

11. Method according to claim 10, wherein a predetermined waiting period is provided between the end of subjection to positive pressure and the beginning of the subjection to vacuum pressure.

12. Method according to claim 10, wherein said movable member is part of a pneumatically operated automotive vehicle door closing system.

13. Apparatus for performing mechanical work comprising:
    a compressed air system of the type which is operable to effect a mechanical work performing operation only when subjected to pneumatic positive pressure and is vented to ambient atmospheric pressure when not performing mechanical work,
    vacuum pressure applying means for applying vacuum pressure to the compressed-air system which is below ambient atmospheric pressure,
    and pressure control means for controlling the vacuum pressure applying means to temporarily apply vacuum pressure following application of work performing positive pressure to thereby cause condensation in the compressed-air system to vaporize,
    and wherein said pressure control means includes means for applying reverse flow through the compressed-air system while the vacuum pressure is applied, thereby assisting in condensate removal.

14. Apparatus for performing mechanical work comprising:
    a compressed-air system of the type which is operable to effect a mechanical work performing operation only when subjected to pneumatic positive pressure and is vented to ambient atmospheric pressure when not performing mechanical work,
    vacuum pressure applying means for applying vacuum pressure to the compressed-air system which is below ambient atmospheric pressure,
    and pressure control means for controlling the vacuum pressure applying means to only temporarily apply vacuum pressure following application of work performing positive pressure to thereby cause condensation in the compressed-air system to vaporize,
    wherein said compressed-air system includes a pressure consumer at which the pneumatic positive pressure is applied to a movable member which performs the mechanical work in response to the subjection thereof to the pneumatic positive pressure,
    and wherein said pressure consumer and movable member are operably connected such that no mechanical work is performed during subjection of said vacuum pressure.

15. Apparatus according to claim 14, wherein said pressure control means includes means for applying the vacuum pressure immediately after the application of the positive pressure to perform work and before venting of the system to ambient atmospheric pressure.

16. Apparatus according to claim 14, wherein said movable member is part of a pneumatically operated automotive vehicle door closing system.

17. Apparatus 16, wherein at least one compressed-air consumer is provided in the compressed-air circuit which is designed as a piston actuator with a housing and a connecting branch, having a lip seal, acting as a non-return valve, between the actuating piston and an inner wall of the housing and a restriction bore being connected into the housing on the other side of the actuating piston from the connecting branch.

18. Device according to claim 17, wherein an outlet bore is arranged in parallel with the restriction bore in the housing of the compressed-air consumer and is closable by a flutter valve.

19. Apparatus according to claim 18, wherein the restriction bore has a large reduction in cross section.

20. Device according to claim 18, wherein the restriction bore is provided with an inserted sintered restrictor bore is provided with an inserted sintered restrictor for filtering the air flowing through in reverse direction.

21. Apparatus according to claim 17, wherein the restriction bore has a large reduction in cross section.

22. Device according to claim 17, wherein the restriction bore is provided with an inserted sintered restrictor for filtering the air flowing through in reverse direction.

23. Apparatus according to claim 16, wherein a pressure generator is provided which is designed as a reversible dual pressure pump used for generating both the positive pressure and the vacuum pressure,
wherein the consumer is connected to the pressure generator via a line and is drivable by subjection to positive pressure so as to perform mechanical work by moving the movable member,
wherein a control circuit for the dual pressure pump is provided which for a limited time switches over the pump after each positive pressure build-up into vacuum-generating operation for the purpose of evacuating the compressed-air system,
wherein a manometric switching device is provided in the compressed-air system for producing pressure threshold signals which are fed to the control circuit to trigger the switching over of the dual pressure pump when certain positive pressure threshold values are reached and for switching off of the dual pressure pump when certain vacuum threshold values are reached.

24. Apparatus according to claim 23, comprising at least one non-return valve arranged near to the consumer, away from the vacuum generation, for permitting reverse flow through the evacuated compressed-air system.

25. Apparatus according to claim 24, comprising a breather valve, switchable by the control circuit, for the compressed-air system, which is switched in parallel with the operation of the pressure generator into the operation of the pressure generator into the position in which it separates the compressed-air system from the atmosphere and, in the state of rest, vents the compressed-air system to the atmosphere.

26. Apparatus according to claim 23, comprising a breather valve, switchable by the control circuit, for the compressed-air system, which is switched in parallel with the operation of the pressure generator into the operation of the pressure generator into the position in which it separates the compressed-air system from the atmosphere and, in the state of rest, vents the compressed-air system to the atmosphere.

27. Apparatus according to claim 26, wherein at least one non-return valve is integrated into a compressed-air consumer.

28. Apparatus according to claim 14, wherein a reversible dual pressure pump is provided for of generation both said positive pressure and said vacuum pressure, and wherein electric control means are provided for controlling operation of the pump with switching from positive pressure generation to vacuum pressure generation immediately following a positive pressure generation.

29. Apparatus according to claim 28, wherein the compressed-air system pressure is momentarily connected to ambient atmosphere after subjection to positive pressure for a mechanical work performing operation to thus reduce the pressure before said subjection to vacuum pressure.

30. Apparatus according to claim 29, wherein a predetermined waiting period is provided between the end of subjection to positive pressure and the beginning of the subjection to vacuum pressure.

31. Apparatus according to claim 14, wherein said pressure consumer and movable member are operably connected such that no mechanical work is performed during subjection of said vacuum pressure.

32. Apparatus according to claim 14, wherein said pressure control means includes means for applying restricted reverse flow through the compressed-air system while the vacuum pressure is applied, thereby assisting in condensate removable.

33. Apparatus according to claim 14, wherein said pressure control means includes means for controlling the vacuum pressure applying means to temporarily apply vacuum pressure immediately following application of work performing positive pressure to thereby cause said condensation in the compressor-air system to vaporize.

34. Apparatus for performing mechanical work comprising:
a compressed-air system of the type which is operable to effect a mechanical work performing operation only when subjected to pneumatic positive pressure and is vented to ambient atmospheric pressure when not performing mechanical work,
vacuum pressure applying means for applying vacuum pressure to the compressed-air system which is below ambient atmospheric pressure,
and pressure control means for controlling the vacuum pressure applying means to apply vacuum pressure following application of work performing positive pressure to thereby cause condensation in the compressed-air system to vaporize,
wherein said compressed-air system includes a pressure consumer at which the pneumatic positive pressure is applied to a movable member which performs the mechanical work in response to the subjection thereof to the pneumatic positive pressure,
wherein said movable member is part of a pneumatically operated automotive vehicle door closing system,
and wherein said apparatus includes:
a positive pressure generator,
a vacuum generator,
at least one consumer connectable both to the positive pressure generator and to the vacuum generator and drivable by subjection to positive pressure so as to perform the mechanical work, a control circuit for the mutually independent electric activation both of the positive pressure generator and of the vacuum generator, a switching device electrically controllable by the control circuit for alternately connecting the compressed-air system to the positive pressure generator and to the vacuum generator and a pressure switching device in the compressor-air system electrically connected to the control circuit, for generating electric pressure threshold signals which are fed to the control circuit to trigger:

the switching off of the positive pressure generator,
the switching over of the switching device,
the switching on of the vacuum generator when certain positive pressure threshold values are reached and
the switching off of the vacuum generator when certain vacuum threshold values are reached.

35. Apparatus according to claim 34 wherein said pressure consumer and movable member are operably connected such that no mechanical work is performed during subjection of said vacuum pressure.

36. Apparatus according to claim 35, comprising at least one non-return valve arranged near to the consumer, away from the vacuum generation, for permitting reverse flow through the evacuated compressed-air system.

37. Apparatus according to claim 36, comprising a breather valve, switchable by the control circuit, for the compressed-air system, which is switched in parallel with the operation of the pressure generator into the operation of the pressure generator into the position in which it separates the compressed-air system from the atmosphere and, in the state of rest, vents the compressed-air system to the atmosphere.

38. Apparatus according to claim 35, comprising a breather valve, switchable by the control circuit, for the compressed-air system, which is switched in parallel with the operation of the pressure generator into the operation of the pressure generator into the position in which it separates the compressed-air system from the atmosphere and, in the state of rest, vests the compressed-air system to the atmosphere.

39. Method for removing condensation from a compressed-air system of the type which is operable to effect a mechanical work performing operation only when subjected to pneumatic positive pressure and is vented to ambient atmospheric pressure when not performing mechanical work, said method comprising:

subjecting the compressed-air system to vacuum pressures below ambient atmospheric pressure following work performing operations to thereby cause condensation in the compressed-air system to vaporize, and applying reverse flow through the compressed-air system while it is subject to the vacuum pressure, thereby assisting in condensate removal.

* * * * *